Oct. 17, 1961 P. P. L. GRANDSARD 3,005,199
RADIO-ELECTRIC MEASUREMENT OF THE ANGULAR POSITION
Filed Sept. 11, 1957
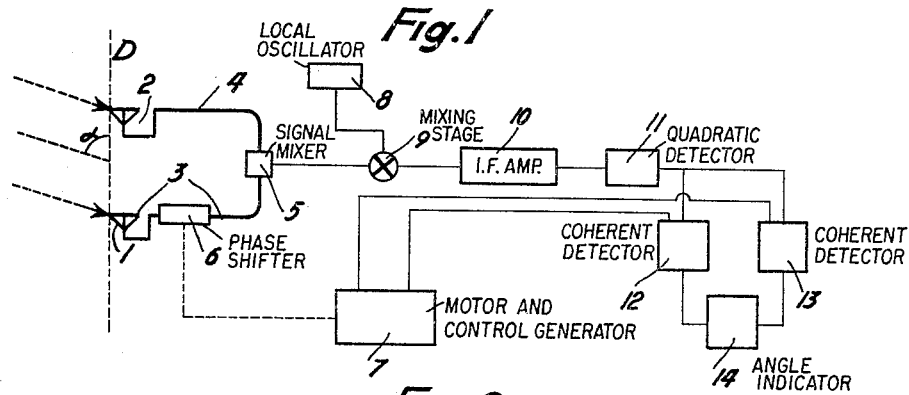
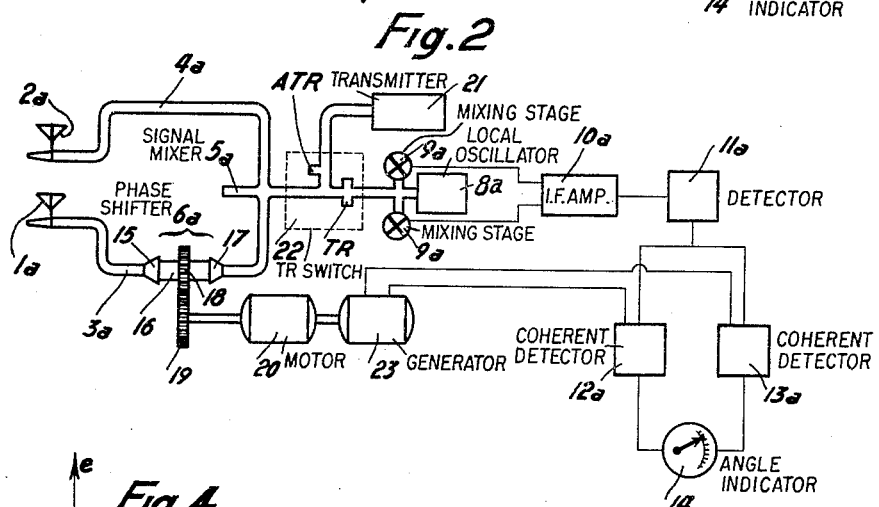
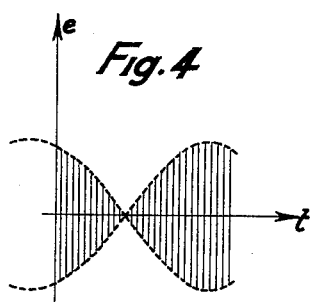
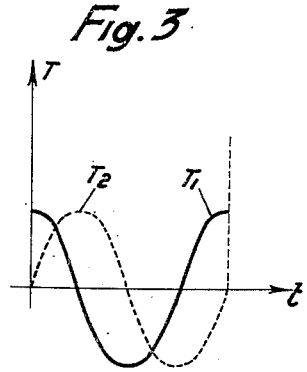
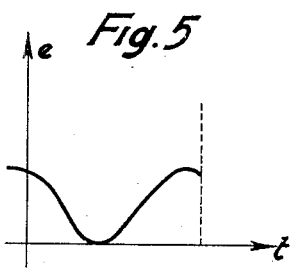
INVENTOR
PIERRE PAUL LOUIS GRANDSARD
BY
ATTORNEYS

United States Patent Office 3,005,199
Patented Oct. 17, 1961

3,005,199
RADIO-ELECTRIC MEASUREMENT OF THE ANGULAR POSITION
Pierre Paul Louis Grandsard, Vincennes, France, assignor to Societe Alsacienne de Constructions Mecaniques Mulhouse, Haut-Rhin, France, a corporation of France
Filed Sept. 11, 1957, Ser. No. 683,243
Claims priority, application France Oct. 18, 1956
7 Claims. (Cl. 343—118)

The present invention relates to the radio-electric measurement of the angular position of an object with the aid of two fixed antennae.

It is known that the measurement of the angular position of an object taken by a radar apparatus, a radiogoniometer of any other like apparatus is carried out either by means of a moving antenna or by means of fixed antennae. In particular, devices have already been described and employed using two fixed antennae per angle to be measured, these devices being based on a comparison of amplitude or of phase of the signals received respectively by the antennae.

In this latter case, the device is such that it effects the sum and the difference of the signals received by two identical and parallel antennae. After changing the frequency of the resulting signals and then amplifying them in two separate channels, namely a "sum" channel and a "difference" channel, a symmetrical detector to which the amplified signals are applied, delivers a potential which serves to characterise one of the angles defining the desired direction.

Such a method of operation has a number of drawbacks. On the one hand, it necessitates the use of two chains of medium-frequency amplification, which must of necessity have a very great stability of phase. On the other hand, the symmetrical detector functions badly when the signals which it receives have amplitudes in the vicinity of that of the noise level. Finally, the energy sent to the input of one of the medium-frequency amplifiers is a function of the angle measured.

The present invention has for its object a method which enables all these drawbacks to be overcome, and also a device for carrying this method into effect.

The method in accordance with the invention, which is applied, as has been already stated, to angular measurements by means of a radio-electric device comprising two fixed antennae, consists essentially in displacing the phase of one of the signals received respectively by the two antennae with respect to the other, in effecting the sum of the signals which have been subjected to this relative phase shift, the resultant signal being thus modulated in amplitude, in amplifying this resultant signal, in detecting the envelope of this amplified signal, in defining the phase of this envelope by a known detection of the so-called "coherent" type and then in measuring this phase in a manner known per se.

The relative phase shift of the signals respectively received by the two antennae may be obtained by causing the signal received by one of the antennae only to be subjected to a phase shift which is a function of time, after which the sum is made of the signal thus phase shifted and of the unmodified signal received by the other antenna.

It may however be an advantage for the purposes of symmetry to proceed by subjecting the signal received by one of the antennae to a positive phase shift, that is to say forward, as a function of time, while the phase of the signal received by the other antenna is shifted by an amount which is at every instant equal but of opposite sign, after which the sum is made of the two signals so displaced in phase.

A device for carrying into effect this method thus comprises mainly two fixed antennae coupled to a circuit arranged so as to effect the sum of the signals received by the antennae, means interposed in the coupling between at least one of the antennae and the said circuit for causing the signal received by the said antenna to be given a phase-shift as a function of time, an intermediate frequency amplifier connected to the output of the said circuit, a detector connected to the output of the said amplifier arranged so as to give the envelope of the signals received from the amplifier, the output of this detector being connected to two coherent detectors, means for applying to these detectors respectively by way of phase reference, potentials which are phase-displaced with respect to each other by a constant value, and means known per se for obtaining from these potentials the value of the phase displacement between the signals received by the two antennae.

The invention is described in greater detail below, reference being made to the accompanying drawings, in which:

FIG. 1 is a basic diagram of an example of embodiment of the invention;

FIG. 2 is a diagram of an example of application of the invention to a radar device for centimeter waves;

FIGS. 3, 4 and 5 are three diagrams representing respectively, in the example of FIG. 2, the potentials used as phase references on the coherent detectors, the form of the signals amplified by the intermediate-frequency amplifier and the form of the output potential from the first detector.

As shown in FIG. 1, the device for carrying the invention into effect comprises two fixed antennae 1 and 2 which are identical and arranged parallel to each other. These two antenna are respectively connected through the circuits 3 and 4 to a signal-mixing device 5 of a type known per se and arranged to effect the sum of the signals which it receives through the circuits 3 and 4. In the circuit 3 which is coupled to the antenna 1, there is interposed in accordance with the invention a phase shifter 6 arranged to subject the signal transmitted by the said circuit 3 to a phase shift $\varphi = kt$ which varies in a linear manner with time. Phase shifter 6 is controlled by motor and control generator 7 which, as will be explained below, are also arranged so as to generate two potentials $T_1$ and $T_2$ having the form:

$$T_1 = p \cos kt$$
$$T_2 = p \sin kt$$

To the output of signal mixing device 5 is connected a frequency-changing receiver comprising a local oscillator 8, a mixing stage 9 and an intermediate-frequency amplifier 10, the output of which is connected to a quadratic detector 11 connected on the other hand to two coherent detectors 12 and 13 which are furthermore respectively connected to motor and control generator 7 of the phase shifter 6 in such manner that the first receives the potential $T_1$ and the second the potential $T_2$, and a circuit 14 of a type known per se, the function of which will be clearly explained below.

The two antennae 1 and 2 placed on the path of an electro-magnetic wave emitted from a source which may be either a transmitter or an object which has reflected a wave emitted by the antennae themselves, which source is located in a direction making an angle $\alpha$ with the straight line D joining the two antennae, receive two signals of equal amplitude A, phase-displaced by an angle $\psi$. The measurement of this angle $\psi$ enables the desired angle $\alpha$ to be immediately known.

This measurement is effected by the circuit shown and described above in the following manner:

The effect of the phase shifter 6 on the signal received by the antenna 1 is equivalent to a linear variation of the phase $$\varphi = kt$$

and the sum of the signals delivered by signal mixing device 5 is thus proportional to $$\cos \frac{\psi + \varphi}{2} = \cos \frac{\psi + kt}{2}$$

where $\varphi$ is the phase shift, $t$ is time and $k$ is a constant.

After changing the frequency by mixture at 9 with the signal obtained from the local oscillator 8, this sum is amplified in the amplifier 10 and is then led to the detector 11 which delivers a potential having the form:

$$V = hA^2[1 + \cos(\psi + kt)]$$

Where V is the detected potential, A is the amplitude of the two signals and $h$ is a constant.

This potential is led to the two coherent detectors 12 and 13 which furthermore receive respectively the potentials $$T_1 = p \cos kt \text{ and } T_2 = p \sin kt$$

The two detectors 12 and 13 then supply the potentials $$V_1 = K \cos \psi \text{ and } V_2 = K \sin \psi$$

which are directed to the indicator device 14 of the phasemeter type which is arranged so as to give the indication of the angle $\psi$.

The diagram shown in FIG. 2 represents the particular application of the invention to a radar apparatus for centimeter waves.

The device shown comprises two dielectric antennae 1a and 2a. It is known that such antennae have small dimensions in a plane perpendicular to their axis of radiation and that they may be placed one with respect to the other at a distance of the order of one wave-length or less without any coupling being observed between them. The measurement of the angle $\alpha$ of arrival of the wave is thus possible without ambiguity over an extended range.

The two antennae are coupled by rectangular wave-guides 3a and 4a to a signal mixer 5a constituted by a T hybrid, one branch of which is closed on its characteristic impedance. In the guide 3a is interposed the phase-shafter 6a. The latter is formed in known manner by three sections 15, 16 and 17. The section 15 is arranged so as to transform the wave which it receives as a straight-line polarised wave to a circular-polarised wave. The section 17 is arranged so as to carry out the reverse operation. With regard to the central portion 16, this is arranged to be driven in rotation by means of gears 18 and 19 from a motor 20, which has the effect of subjecting the wave which it receives from the section 15 to a phase displacement equal to twice its angle of rotation.

The motor 20 rotates at 25 revolutions per second from which it results that the signal received by the antenna 1 is subjected to a regularly increasing phase-shifter dephasing so as to increase by $2\pi$ at a frequency of 50 cycles per second.

Following the mixing stage 5a are arranged the elements of a standard radar apparatus, namely a transmitter 21, a transmitter-receiver change-over switch 22 comprising a tube ATR interrupting the transmission circuit and a tube TR protecting the reception, a local oscillator 8a, a balanced mixer 9a, an intermediate-frequency amplifier 10a and a detector 11a.

To this latter are connected the two coherent detectors 12a and 13a, the respective inputs of which are also coupled to a generator 23 fixed on the shaft of the driving motor 20 of the phase-shifter device 6a, this generator being arranged so as to produce the two potentials $T_1$ and $T_2$ at 50 cycles per second in quadrature of phase, as shown in FIG. 3.

The outputs of the two detectors 12a and 13a are themselves connected to the angle indicator 14a which may be graduated to give a direct reading of the angles $\alpha$.

When transmitting, the energy produced is sent into the T hybrid 5a and is distributed between the two antennae in such manner that the transmission diagram shall be at every instant the same as during reception. The latter is effected in the manner described with reference to FIG. 1, the intermediate frequency signal obtained at the output of the amplifier 10a having the form shown in FIG. 4, whilst the output potential from the detector 11a has the shape shown in FIG. 5. In fact, the transmitter 21 produces impulses the repetition frequency of which is equal to 1,000 cycles per second and is sufficiently great with respect to the frequency displacement introduced by the phase shifter 6a for the detector 11a to be able to eliminate the impulses and to preserve the envelope of the modulation at 50 cycles obtained from the mixture of the signals at 5a.

The coherent detectors 12a and 13a thus receive respectively potentials at 50 cycles phase displaced between each other by $\psi$ for one of them and by $$\frac{\pi}{2} - \psi$$

for the other. They deliver continuous potentials, proportional to $\cos \psi$ and $\sin \psi$ from which it is easy to obtain the indication of $\psi$ and thus of the angle $\alpha$.

The examples described above should clearly be considered as purely by way of illustration and all alternative forms of detail may be made thereto without departing from the scope of the invention. Thus, the application of the invention is in no way limited to frequency-changing receivers, and any other type of receiver may also be employed. In the same way, the law of the detector 11 or 11a may be different from that referred to above without this constituting a modification of the method.

The phase-shift of the signal received by one of the antennae may also be obtained by any means other than that which has been more particularly described, for example by means of a fixed apparatus causing a rotating field to act on a section of guide partly filled with a ferro-magnetic ferrite. As has been already mentioned, with a view to obtaining a symmetrical circuit arrangement, a phase shifter may also be interposed in each of the antenna circuits 3 or 3a and 4 or 4a, the phase shifter inserted in one of the circuits producing a phase displacement of $+\varphi/2$ and that interposed in the other circuit causing a phase displacement of $-\varphi/2$ with $\varphi = kt$ as before.

The radio-electric device for angular measurement thus described has the following advantages:

In addition to the use of a single chain of amplification at intermediate frequency, for which stability of phase is not required, the utilisation of coherent detectors has the effect of producing a better distinction of weak signals with respect to the background noise.

In addition, with this device, the intensity of the signal collected in the mixer does not depend on the angle $\alpha$. As soon as the source of radiant energy deviates from the defined direction by $$\alpha = \frac{\pi}{2}$$

it is greater than that which is collected by means of devices of the same kind known up to the present time.

What I claim is:

1. An apparatus for measuring the incident angle of electro-magnetic waves, said apparatus comprising two fixed antennae, summing means coupled to said antennae and adapted to effect the sum of the signals received on said antennae, phase shifting means included in the coupling between at least one of said antennae and said summing means for causing phase displacement of said signal as a function of time, amplifier means coupled to the output of said summing means, detector means coupled to the output of said amplifier means and adapted to give an envelope of the signals received from said amplifier means, a pair of coherent detector means connected to the output of said detector means, means for respectively applying to said coherent detector means potentials displaced in phase with respect to each other by a constant phase value, and means connected to the output of said coherent detector means for measuring the resultant phase value, said resultant phase value corresponding to the difference in phase of the electro-magnetic waves received at said antennae, whereby the incident angle of said electro-magnetic waves are obtained.

2. An apparatus as claimed in claim 1 including radar receiver means having a detector means coupled to said coherent detector means.

3. An apparatus as claimed in claim 1 in which said amplifier means includes an intermediate frequency amplifier means.

4. An apparatus as claimed in claim 1, including wave-guide means connecting said summing means to said antennae, in which said phase-shifting means is interposed in said wave-guide means coupled to at least one of said antennae, said phase shifting means being formed in at least three sections, the input section transforming plane-polarized waves to circular-polarized waves, the output section carrying out the reverse operation, while the central section is driven in rotation so as to impart to the received wave a periodic phase shift equal to twice its angle of rotation.

5. An apparatus as claimed in claim 1, in which said phase shifting means is formed in at least three sections, an input section transforming plane-polarized waves to circular-polarized waves, an output section carrying out the reverse operation, and a central section, and including means for driving said central section in rotation and generator means coupled to said driving means and adapted to produce two potentials in phase quadrature, said potentials being applied to the input circuits of the two coherent detector means.

6. An apparatus as claimed in claim 1, including wave-guide means connecting said summing means to said antennae, a section of said wave-guide means being partly filled with ferro-magnetic ferrite means, in which said phase-shifting means comprises a rotating field adapted to act upon said section of wave-guide means which is partly filled with said ferro-magnetic ferrite means.

7. An apparatus as claimed in claim 1, in which said phase shifting means is included in the coupling between each of said antennae and said summing means, said phase shifting means being arranged to shift the phase of the received signals by amounts which are respectively equal and of opposite sign.

References Cited in the file of this patent

UNITED STATES PATENTS

| 2,449,553 | Hansel | Sept. 21, 1948 |
| 2,474,268 | Marchand | June 28, 1949 |
| 2,923,006 | Vernhes et al. | Jan. 26, 1960 |
| 2,943,323 | Ryan | June 28, 1960 |

FOREIGN PATENTS

| 553,618 | Great Britain | May 28, 1943 |

UNITED STATES PATENT OFFICE
CERTIFICATE OF CORRECTION

Patent No. 3,005,199                                   October 17, 1961

Pierre Paul Louis Grandsard

It is hereby certified that error appears in the above numbered patent requiring correction and that the said Letters Patent should read as corrected below.

In the grant, lines 3 and 13, and in the heading to the printed specification, line 5, in the assignment, after "Mecaniques", each occurrence, insert a comma; column 2, line 34, for "antenna" read -- antennae --; column 3, lines 56 and 57, strike out "dephasing".

Signed and sealed this 3rd day of July 1962.

(SEAL)
Attest:

ERNEST W. SWIDER                                       DAVID L. LADD
Attesting Officer                                           Commissioner of Patents